US010938895B2

(12) United States Patent
Gkellas et al.

(10) Patent No.: US 10,938,895 B2
(45) Date of Patent: Mar. 2, 2021

(54) INSTANTIATING A VIRTUAL NETWORK FUNCTION COMPRISING AT LEAST ONE VIRTUAL NETWORK FUNCTION COMPONENT

(71) Applicant: NOKIA SOLUTIONS AND NETWORKS OY, Espoo (FI)

(72) Inventors: Georgios Gkellas, Petroupoli Attikis (GR); Carlos Manzanares Sancho, Tampere (FI); Szabolcs Csaba Deak, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 97 days.

(21) Appl. No.: 15/769,357

(22) PCT Filed: Oct. 19, 2015

(86) PCT No.: PCT/EP2015/074099
§ 371 (c)(1),
(2) Date: Apr. 19, 2018

(87) PCT Pub. No.: WO2017/067567
PCT Pub. Date: Apr. 27, 2017

(65) Prior Publication Data
US 2018/0309824 A1    Oct. 25, 2018

(51) Int. Cl.
*H04L 29/08* (2006.01)
*H04L 12/24* (2006.01)
*G06F 9/455* (2018.01)

(52) U.S. Cl.
CPC ...... *H04L 67/1031* (2013.01); *G06F 9/45558* (2013.01); *H04L 41/0806* (2013.01);
(Continued)

(58) Field of Classification Search
CPC ... G06F 2009/4557; G06F 2009/45595; G06F 9/45558; H04L 41/0806; H04L 67/1031; H04L 67/32
See application file for complete search history.

(56) References Cited

U.S. PATENT DOCUMENTS 10,116,571 B1 * 10/2018 Bertz ................. H04L 67/38
10,348,590 B2 * 7/2019 Shaw ................. H04L 43/0811
(Continued)

FOREIGN PATENT DOCUMENTS

CN        104954220 A    9/2015
WO    WO 2015/126430 A1    8/2015

OTHER PUBLICATIONS

International Search Report & Written Opinion dated Jun. 16, 2016 corresponding to International Patent Application No. PCT/EP2015/074099.
(Continued)

*Primary Examiner* — Mohamed A. Wasel
(74) *Attorney, Agent, or Firm* — Squire Patton Boggs (US) LLP

(57) ABSTRACT

An apparatus and a method are provided by which a virtual network function is instantiated. The virtual network function comprises at least one virtual network function component. Each virtual network function component is described by a virtual deployment unit. At least one virtual deployment unit is indicated as an inactive virtual deployment unit. Upon instantiating a virtual network function, only a virtual network function component which is not described by an inactive deployment unit is instantiated when instantiating the virtual network function.

15 Claims, 2 Drawing Sheets

(52) U.S. Cl.
CPC ...... *H04L 67/32* (2013.01); *G06F 2009/4557* (2013.01); *G06F 2009/45595* (2013.01)

(56) References Cited

U.S. PATENT DOCUMENTS

| | | | | |
|---|---|---|---|---|
| 2014/0317261 | A1* | 10/2014 | Shatzkamer | G06F 9/45558 709/223 |
| 2015/0288541 | A1* | 10/2015 | Fargano | H04L 43/08 709/225 |
| 2015/0358248 | A1* | 12/2015 | Saha | H04L 47/12 709/226 |
| 2016/0335111 | A1* | 11/2016 | Bruun | G06F 9/45558 |
| 2017/0048110 | A1* | 2/2017 | Wu | H04L 41/12 |
| 2017/0063927 | A1* | 3/2017 | Schultz | H04L 63/20 |
| 2017/0150399 | A1* | 5/2017 | Kedalagudde | H04L 43/16 |
| 2017/0257276 | A1* | 9/2017 | Chou | H04L 41/0896 |
| 2018/0183851 | A1* | 6/2018 | Fiedler | H04L 67/1031 |

OTHER PUBLICATIONS

Mano WG—Phase 1 Accomplishments Raquel Morera et al: "Mano WG—Phase 1 Accomplishments; NFVMAN (14)000433r1_ETSI_NFV_MAN_WG_Phase_1_Accomplishments," ETSI Draft; vol. ISG-NFV, Nov. 18, 2014, pp. 1-16, XP014228979.

Nokia Networks et al: "Remaining VNF Lifecycle; NFVSWA(14)CR_013r3_Remaining_VNF_Lifecycle," ETSI Draft; NFVMAN(14)CR_001, Oct. 2, 2014, pp. 1-14, XP014220660.

ETSI, ETSI et al: "Network Functions Virtualisation (NFV); Management and Orchestration," Group Specification, ETSI GS NFV-MAN 001 V1.1.1 (Dec. 2014), Dec. 1, 2014, pp. 1-184, XP055278655.

Chinese Office Action corresponding to CN Appln. No. 201580083970.5, dated Jun. 24, 2020.

Second Office Action dated Jan. 19, 2021 corresponding to Chinese Patent Application No. 201580083970.5, and concise statement of relevance.

* cited by examiner

INSTANTIATING A VIRTUAL NETWORK FUNCTION COMPRISING AT LEAST ONE VIRTUAL NETWORK FUNCTION COMPONENT

FIELD OF THE INVENTION

The present invention relates to an apparatus, a method and a computer program product for instantiating a virtual network function comprising at least one virtual network function component.

RELATED BACKGROUND ART

The following meanings for the abbreviations used in this specification apply:
APN Access Point Name
BSS Business Support System
cNG Cloud NG (Nokia product name)
IE Information Element
EM Element Manager
ETSI European Telecommunications Standards Institute
NFV Network Functions Virtualization
NFVI NFV Infrastructure
NFV-MANO NFV Management and Orchestration
NFVO Network Functions Virtualization Orchestrator
NG Network Gateway (Nokia product name)
NM Network Manager
NS Network Service
OSS Operations Support System
SG Service Group
SLA Service Level Agreement
VDU Virtual Deployment Unit (also referred to as Virtualized Deployment Unit)
VNF Virtual Network Function (also referred to as Virtualized Network Function)
VNFC VNF Component
VNCFI VNFC Instance
VNFD VNF Descriptor
VNFM VNF Manager
VIM Virtualized Infrastructure Manager
VM Virtual Machine Embodiments of the present invention relate to Network Function Virtualization (NFV). The applicable reference architecture, as dictated by ETSI NFV, is depicted in FIG. 1.

In the following, some definitions in connection with the elements shown in FIG. 1 are given:

Network Function (NF): functional block within a network infrastructure that has well-defined external interfaces and well-defined functional behavior. In practical terms, a Network Function is today often a network node or physical appliance.

Network Functions Virtualization (NFV): principle of separating network functions from the hardware they run on by using virtual hardware abstraction Network Functions Virtualization Infrastructure (NFVI): totality of all hardware and software components that build up the environment in which VNFs are deployed. The NFV-Infrastructure can span across several locations, e.g. places where data centers are operated. The network providing connectivity between these locations is regarded to be part of the NFV-Infrastructure.

Network Functions Virtualization Management and Orchestration (NFV-MANO): functions collectively provided by NFVO, VNFM, and VIM Network Functions Virtualization Orchestrator (NFVO): functional block that manages the Network Service (NS) lifecycle and coordinates the management of NS lifecycle, VNF lifecycle (supported by the VNFM) and NFVI resources (supported by the VIM) to ensure an optimized allocation of the necessary resources and connectivity.

Virtual Machine (VM): virtualized computation environment that behaves very much like a physical computer/server.

Virtual Network: virtual network routes information among the network interfaces of VM instances and physical network interfaces, providing the necessary connectivity. The virtual network is bounded by its set of permissible network interfaces.

Virtualized Infrastructure Manager (VIM): functional block that is responsible for controlling and managing the NFVI compute, storage and network resources, usually within one operator's Infrastructure Domain (e.g. NFVI-PoP).

Virtualized Network Function (VNF): implementation of an NF that can be deployed on a Network Function Virtualization Infrastructure (NFVI).

Virtualized Network Function Manager (VNFM): functional block that is responsible for the lifecycle management of VNF.

For verifying a Virtual Network Function (VNF) and control its lifecycle operations a set of artifacts is created by the VNF provider for each VNF. This set of artifacts is called VNF package. It includes images and all needed metadata descriptors. ETSI GS NFV-MAN 001 v1.1.1 (2014-12) describes the Information Elements (IE) of the VNF Descriptor (VNFD). Ongoing standardization activities (ETSI GS NFV IFA011) aim at creating a VNF packaging specification.

A Virtual Deployment Unit (VDU) is a construct that is used in an information model, supporting the description of the deployment and operational behavior of a subset of a VNF, or the entire VNF if it is not componentized in subsets. VDUs are a "declaration time" element as it is called. VDUs are used for instantiating VNF Components (VNFCs).

However, instantiating of a VNF may require a considerable amount of resources.

SUMMARY OF THE INVENTION

Embodiments of the present invention address this situation and aim to overcome the above-described problem and to reduce the amount of resources for instantiating of a virtual network function.

According to a first aspect of the present invention an apparatus which comprises at least one processing circuitry, and at least one memory for storing instructions to be executed by the processing circuitry, wherein the at least one memory and the instructions are configured to, with the at least one processing circuitry, cause the apparatus at least: to instantiate a virtual network function, wherein the virtual network function comprises at least one virtual network function component, each virtual network function component being described by a virtual deployment unit, and at least one virtual deployment unit being indicated as an inactive virtual deployment unit, wherein the at least one memory and the instructions are configured to, with the at least one processing circuitry, cause the apparatus, upon instantiating a virtual network function, to instantiate only a virtual network function component which is not described by an inactive deployment unit when instantiating the virtual network function.

According to a second aspect of the present invention a method for use in a virtual network function manager is provided which comprises instantiating a virtual network function, wherein the virtual network function comprises at least one virtual network function component, each virtual network function component being described by a virtual deployment unit, and at least one virtual deployment unit being indicated as an inactive virtual deployment unit, and upon instantiating a virtual network function, instantiating only a virtual network function component which is not described by an inactive deployment unit when instantiating the virtual network function.

The first aspect and the second aspect may be modified as follows:

For example, the inactive virtual deployment unit may be indicated as inactive by a specific information element of the virtual deployment unit, wherein a value of the information element for the inactive virtual deployment unit indicates that a minimum number of instances can be zero.

Furthermore, the specific information element may be "scale_in_out", and the value of the information element for the inactive virtual deployment unit may be zero.

The specific information element may be "number_of_instances", and the value of the information element for the inactive virtual deployment unit may be zero.

Moreover, the virtual network function component described by the inactive virtual deployment unit may be instantiated after instantiating the virtual network function.

The virtual network function component described by the inactive virtual deployment unit may be instantiated in response to receiving a trigger from an application.

The virtual network function component described by the inactive virtual deployment unit may be instantiated by performing a scale out operation.

The virtual network function component described by the inactive virtual deployment unit may be instantiated by performing a dedicated operation.

According to a third aspect of the present invention a computer program product is provided which comprises code means for performing a method according to the second aspect and/or its modifications when run on a processing means or module. The computer program product may be embodied on a computer-readable medium, and/or the computer program product may be directly loadable into the internal memory of the computer and/or transmittable via a network by means of at least one of upload, download and push procedures.

According to a fourth aspect of the present invention an apparatus is provided which comprises means for instantiating a virtual network function, wherein the virtual network function comprises at least one virtual network function component, each virtual network function component being described by a virtual deployment unit, and at least one virtual deployment unit being indicated as an inactive virtual deployment unit, and means for, upon instantiating a virtual network function, instantiating only a virtual network function component which is not described by an inactive deployment unit when instantiating the virtual network function.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

Figure 1:
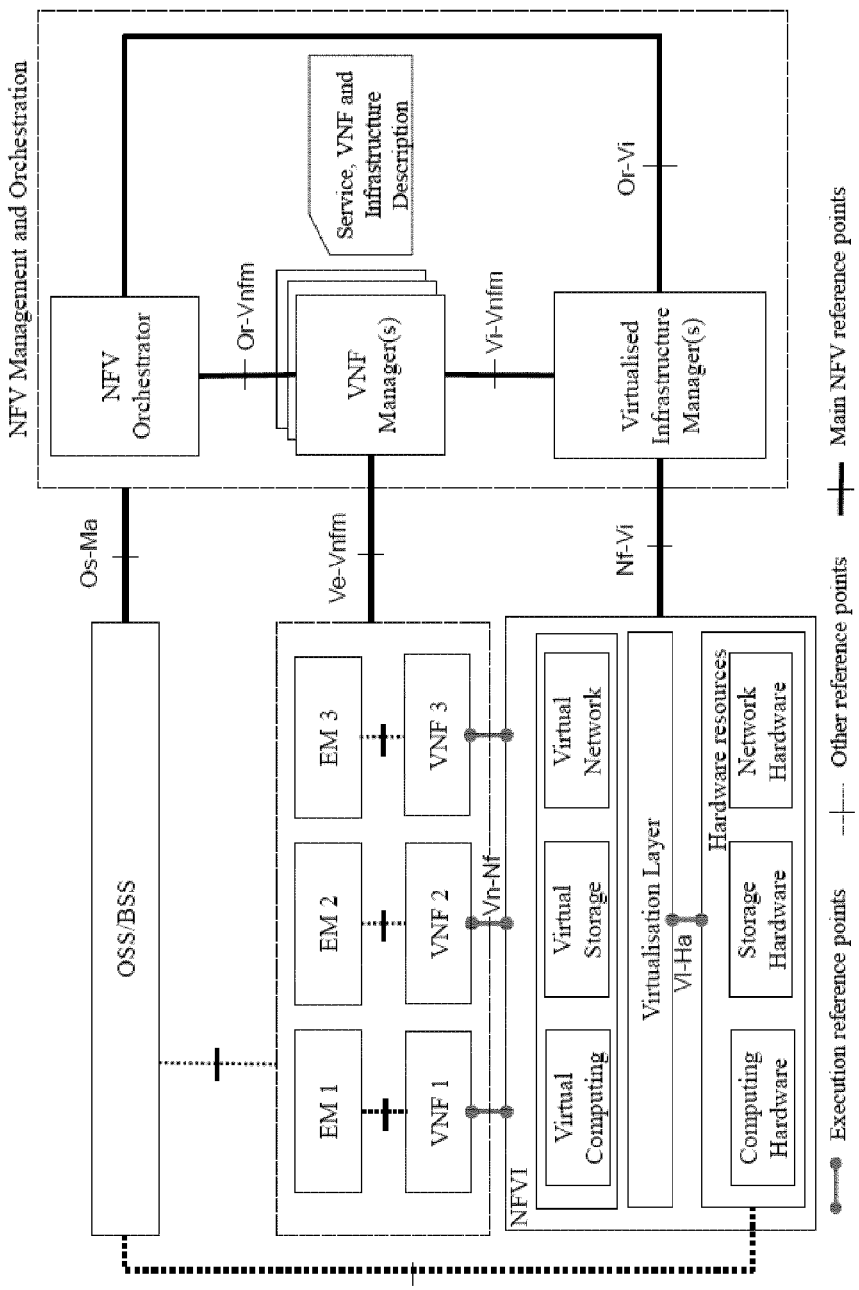
FIG. 1 illustrates an applicable reference architecture for NFV.

In the following, description will be made to embodiments of the present invention. It is to be understood, however, that the description is given by way of example only, and that the described embodiments are by no means to be understood as limiting the present invention thereto.

As described above, embodiments of the present invention aim to reduce resource in connection with instantiating a virtual network function. The existing ETSI NFV MANO model as described in ETSI GS NFV-MAN 001 v1.1.1 (2014-12) is using all VDUs of a VNF when a VNF is instantiated, and instantiates VNFC Instances (VNFCIs) based on these VDUs.

There might be some VNFCs which are not needed at VNF instantiation. These VNFCs will be instantiated in runtime triggered by application features. An example of such a case is a "Service Group" (SG) feature of cloud NG (cNG). SGs are linked to specific Access Point Names (APNs) and are using dedicated VMs for serving sessions to these APNs. So, the SGs constitute VNFCs and are described by VDUs but their instantiation when VNF is instantiated leads to loss of resources, if SGs are not activated application wise.

VNFCs, like SGs as described above, must be included in the relevant VNFD, i.e. appropriate VDUs must be included in the VNFD. Currently, the "Instantiate VNF" operation will instantiate the VNFCs which are not automatically needed when the VNF is instantiated consuming useless resources from the NFV Infrastructure (NFVI) and unnecessary loading elasticity components with the task of evaluating dynamic elasticity needs for the said VNFCs. Healing mechanisms will also proceed to healing of the relevant VMs after any failure but without healing anything in fact as the relevant VMs will not be used by the VNF. All in all the whole NFV architecture will burden carrying a set of VMs useless for the VNF.

In other words, in NFV, for each Virtual Network Function (VNF) Virtual Deployment Units (VDU) are used to describe the deployment and the operational behavior of the VNF. More particularly, in most cases a VNF consists of multiple VNF components (VNFCs) and for each individual VNFC a VDU may be used for its instantiation. Currently, whenever a VNF is instantiated all related VDUs are used. That is, when a VNF is instantiated, all VDUs (relating to the overall VNF) are used and all components are instantiated to VNFC Instances (VNFCI). However, some of the VNFCs may not (immediately) be needed for operation of the overall VNF.

According to some embodiments, of the present invention, it is proposed to use a kind of "dormant" VDUs (also referred to as inactive VDUs) for solving the above issue. In particular, such dormant VDUs will not be instantiated when the VNF is instantiated.

Moreover, also a custom VNF operation to instantiate dormant VDUs is proposed.

Both proposals constitute extensions to the current MANO model, which is described in ETSI GS NFV-MAN 001 v1.1.1 (2014-12).

Thus, according to some embodiments of the present invention it is proposed that not all VDUs will always be instantiated when a VNF is instantiated, but that VDUs can also be generated as "dormant" VDUs. With this, the VDUs remain part of the overall VNF description, but they will not have to be directly instantiated. These "dormant" VDUs would only be instantiated when needed during operation. Thus, during initial instantiation of the VNF resources can advantageously be saved.

Dormant VDUs allows VNF providers to choose the VDUs to be instantiated when the VNF is instantiated and the relevant custom operation is the trigger point to instantiate dormant VDUs. In this way all issues described above are tackled.

It is to be noted that instantiated (or instantiation) means in the context of the present description, for example, that a virtual network function acting in a communication network in the virtual network part is deployed, turned on, activated or made in some other manner available for other communication network elements or functions.

In the following, a general embodiment of the present invention is described by referring to FIG. 2.

Figure 2:
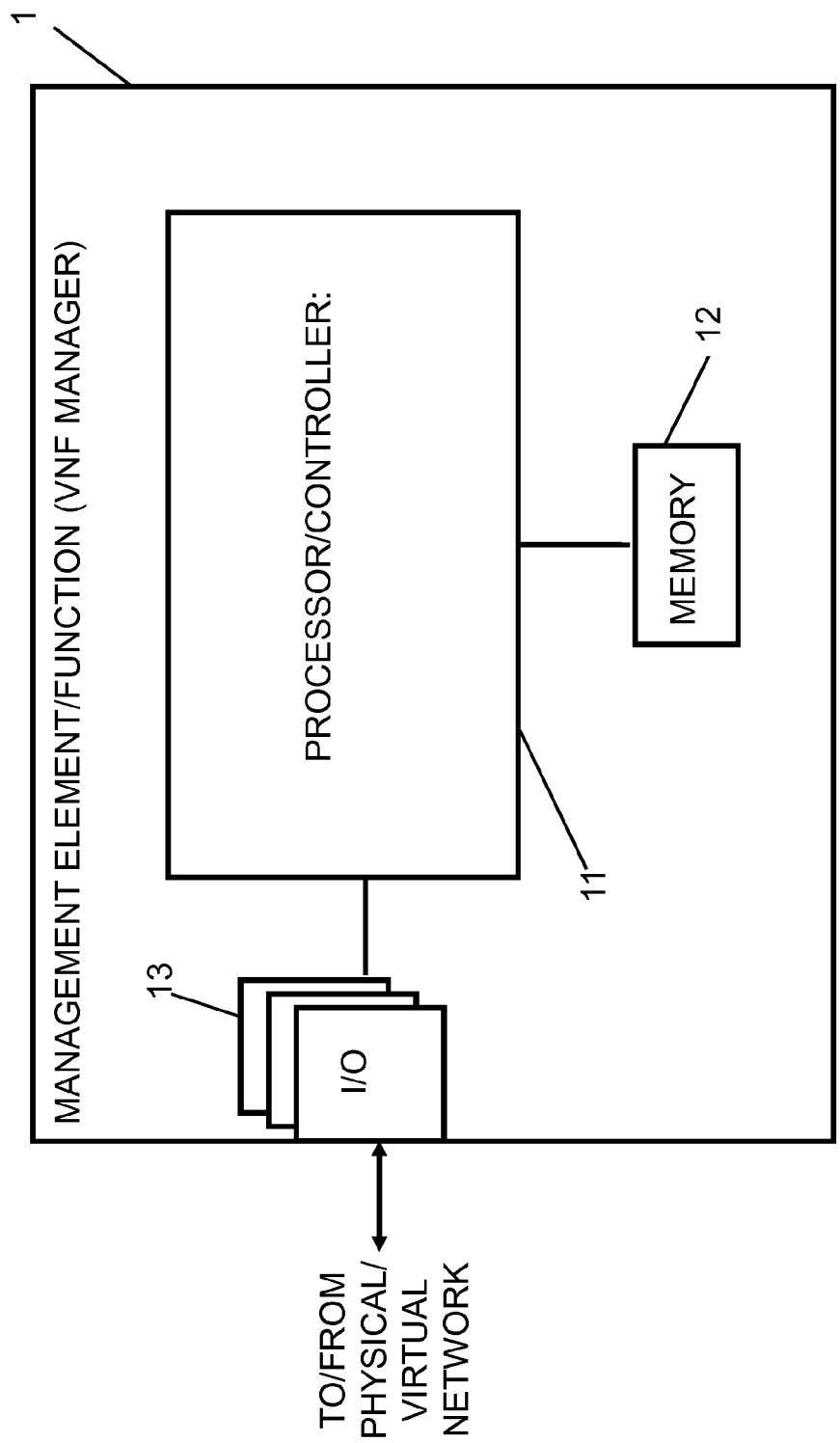
FIG. 2 shows a simplified structure of a management element/function according to an embodiment of the present invention.

In particular, FIG. 2 shows a management element/function 1 as an example for an apparatus according to an embodiment of the invention. According to some embodiments, the management element/function 1 may be a VNF Manager (VNFM). The management element/function 1 comprises a processor/controller 11 as an example for at least one processing circuitry and a memory 12 as an example for at least one memory for storing instructions to be executed by the processing circuitry.

The memory 12 and the instructions are configured to, with the processor 11, cause the management element/function 1 to instantiate a virtual network function, wherein the virtual network function comprises at least one virtual network function component, each virtual network function component being described by a virtual deployment unit, and at least one virtual deployment unit being indicated as an inactive virtual deployment unit, wherein the memory 12 and the instructions are configured to, with the processor 11, cause the management element/function 1, upon instantiating a virtual network function, to instantiate only a virtual network function component which is not described by an inactive deployment unit when instantiating the virtual network function.

Thus, according to the general embodiment described above, some VDUs can be indicated as inactive VDUs or dormant VDUs which are not instantiated upon instantiating a virtual network function (i.e., are not used for instantiating a correspondent virtual network function component (VNFC)).

Hence, VNFCs which are not required upon instantiating of a VNF may be instantiated later when necessary. Thus, unnecessary resources can be saved.

In addition, management element/function 1 may further comprise input/output (I/O) units or functions (interfaces) 13 connected to the processor or processing function 11. The I/O units 13 may be used for communicating with other management entities or functions, as described in connection with FIG. 1, for example, such as OSS/BSS, NFVO, VIM and the like.

In the following, more detailed embodiments of the present invention are described.

As described above, the VDU describes deployment and operational aspects of a VNFC. VDU is a part of VNFD. Deployment refers to resource requirements plus constraints (e.g. affinity), and instantiation/activation of the VNFC; operational refers to lifecycle actions after the deployment like scale-out, etc. A VNFC instance maps 1:1 against a single Virtualization Container (which is partition of a compute node (abstract definition of a server) that provides an isolated virtualized computation environment), and a VNFC Instance is created out of a VDU.

Hence, a VDU is used for instantiating a VNFC, and when a VNF is instantiated, the VNFM is using the VNFD and the VDU in the VNFD to instantiate the necessary VNFCs to compose the VNF instance.

As mentioned above, embodiments of the present invention relate to such a scenario where the VNFD can contain a VDU description for a specific VNFC, but during VNF deployment (instantiation of VNF) the specific VNFC may not be needed. The instantiation of that specific VNFC may be considered a scale-out operation or even a new operation to instantiate the specific VNFC. The instantiation trigger might be coming from the application.

A use case to support this scenario can be the following: There can be some specific VNFC types which are needed (its instances) only when a specific application service is in use. Therefore it is possible that a VNF is in up and running, while that specific VNFC type is not instantiated.

So it is possible that the VNF needs e.g. to be scaled out e.g. on the request of an EM telling also to instantiate the first instances of a specific VNFC. So a dynamic VDU means that the VDU is described in the VNFD for the VNF, but during VNF instantiation procedure there might be no need to instantiate any single VNFC out of that VDU. The instantiation of the VNFC from that VDU might happen as a scale-out operation or a new vendor specific operation.

Therefore, according to embodiments of the present invention, it is proposed that the VNFD supports the description of dynamic VDUs and that MANO Functional blocks shall support instantiation of a specific VNFC (First instance) from a VDU as a scale-out or a vendor specific operation.

It is to be noted that a scaling operation means in the context of the present description, for example, changing the configuration of virtualized resources (scale up, e.g., add a CPU, or scale down, e.g., remove a CPU), adding new virtualized resources (scale out, e.g., add a new VM), shutting down and removing instances (scale in), or releasing some virtualized resources (scale down). That is, in general "scale out" of a VNF means that the capacity of the VNF is increased.

In the following, some examples are given as to how dormant VDUs can be described, by referring to ETSI GS NFV-MAN 001 v1.1.1 (2014-12).

1. The "scale_in_out" IE (vnfd:vdu:scale_in_out) specified in ETSI GS NFV-MAN 001 v1.1.1 (2014-12), section 6.3.1.2.1 can be allowed to start from value 0. This implies that the minimum number of instances can be zero; i.e. the relevant VNFC is not instantiated.

2. It can be allowed that the "number_of_instances" IE (vnfd:deployment_flavour:constituent_vdu:number_of_instances) specified in ETSI GS NFV-MAN 001 v1.1.1 (2014-12), section 6.3.1.5.1 to start from value 0.

This is considered the spontaneous way to support dormant VDUs in the context of the existing MANO models, giving the option to operators to decide based on the flavour if dormant VDUs will be instantiated during VNF instantiation or not.

In runtime, the application might need the functionality of the dormant VNFC and then the VNFC will be instantiated. For the SG example referred to above, the use case is that the operator for a specific corporate (new or existing) needs to use the SG, e.g. to dedicate HW for serving this corporate (due to an SLA). Then the dormant VDU will be instantiated. Two alternatives are foreseen:

1. The dormant VDU is instantiated as a "Scale VNF" operation as described in ETSI GS NFV-MAN 001 v1.1.1 (2014-12), section 7.2.4.2.
2. The dormant VDU is instantiated via a new VNF custom operation, an extension of the list of operations described in ETSI GS NFV-MAN 001 v1.1.1 (2014-12), section 7.2.4.2.

In order to affect the current MANO models as less as possible, the first option is preferable. In particular, for SGs use case the first option is preferable when the capabilities of the corresponding VNF Manager (VNFM) are sufficient.

However, the preferred way would be the second option as it gives flexibility and clear orchestration tasks to VNFM. With the first option, the VNFM will have to orchestrate an "instantiate VDU" workflow although the operation is "Scale". The custom operation allows the VNFM to apply a different workflow to the "scale" case, e.g. the "instantiate VDU" might instantiate two increments to avoid single points of failure, where-as the scale might instantiate a single increment (potentially composed of 2 VMs in 2N high availability mode). The custom operation can be modeled and potentially parameterized.

Thus, according to some embodiments of the present invention, only those VDUs are instantiated when a VNF is instantiated which are actually needed, and other VDUs can also be generated as dormant VDUs. In this way, the VNF resources can advantageously be saved.

It is noted that the present invention is not limited to the embodiments described above. In particular, modifications and variations are possible.

For example, the management element/function 1 shown in FIG. 2, which is configured to act as a VNFM, may include further elements or functions besides those described herein below.

Furthermore, even though reference is made to a network element, management entity or function, the element, entity or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The processor 11 of management element or function shown in FIG. 2 may also be or include a processing circuitry, a processing function or a control unit, such as a CPU or the like, which is suitable for executing instructions given by programs or the like related to the control procedure. The processor 11 may include one or more processing portions or functions dedicated to specific processing as described in connection with FIG. 2 above, or the processing may be run in a single processor or processing function. Portions for executing such specific processing may be also provided as discrete elements or within one or more further processors, processing functions or processing portions, such as in one physical processor like a CPU or in one or more physical or virtual entities, for example.

The I/O units 13 shown in FIG. 2 may be a combined unit including communication equipment towards several management entities, or may include a distributed structure with a plurality of different interfaces for different entities. The memory 12 shown in FIG. 2 may be a memory usable, for example, for storing data and programs to be executed by the processor or processing function 11 and/or as a working storage of the processor or processing function 11. It is to be noted that the memory 12 may be implemented by using one or more memory portions of the same or different type of memory.

It is to be understood that any of the above modifications can be applied singly or in combination to the respective aspects and/or embodiments to which they refer, unless they are explicitly stated as excluding alternatives.

For the purpose of the present invention as described herein above, it should be noted that 1)—method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

2)—generally, any method step is suitable to be implemented as software or by hardware without changing the idea of the invention in terms of the functionality implemented;

3)—method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

4)—devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

5)—an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

6)—a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. An apparatus, comprising:
    at least one processing circuitry; and
    at least one memory for storing instructions to be executed by the processing circuitry; wherein the at least one memory and the instructions are configured to, with the at least one processing circuitry, cause the apparatus at least to:
        instantiate a virtual network function, wherein the virtual network function comprises at least one virtual network function component, each virtual network function component being described by a virtual deployment unit, and at least one virtual deployment unit being indicated as an inactive virtual deployment unit by a specific information element of the virtual deployment unit, and wherein a value of the specific information element for the inactive virtual deployment unit indicates that a minimum number of instances can be zero, and
        upon instantiating the virtual network function, to instantiate only a virtual network function component which is not described by an inactive deployment unit when instantiating the virtual network function.

2. The apparatus according to claim 1, wherein the specific information element comprises "scale_in_out", and the value of the specific information element for the inactive virtual deployment unit is zero.

3. The apparatus according to claim 1, wherein the specific information element comprises "number_of_instances", and the value of the specific information element for the inactive virtual deployment unit is zero.

4. The apparatus according to claim 1, wherein the at least one memory and the instructions are further configured to, with the at least one processing circuitry, cause the apparatus at least to:
    instantiate the virtual network function component described by the inactive virtual deployment unit after instantiating the virtual network function.

5. The apparatus according to claim 4, wherein the at least one memory and the instructions are further configured to, with the at least one processing circuitry, cause the apparatus at least to:
    instantiate the virtual network function component described by the inactive virtual deployment unit in response to receiving a trigger from an application.

6. The apparatus according to claim 4, wherein the at least one memory and the instructions are further configured to, with the at least one processing circuitry, cause the apparatus at least to:
    instantiate the virtual network function component described by the inactive virtual deployment unit by performing a scale out operation.

7. The apparatus according to claim 4, wherein the at least one memory and the instructions are further configured to, with the at least one processing circuitry, cause the apparatus at least to:
    instantiate the virtual network function component described by the inactive virtual deployment unit by performing a dedicated operation.

8. A method for use in a virtual network function manager, said method comprising:
    instantiating a virtual network function, wherein the virtual network function comprises at least one virtual network function component, each virtual network function component being described by a virtual deployment unit, and at least one virtual deployment unit being indicated as an inactive virtual deployment unit by a specific information element of the virtual deployment unit, and wherein a value of the specific information element for the inactive virtual deployment unit indicates that a minimum number of instances can be zero, and
    upon instantiating the virtual network function, instantiating only a virtual network function component which is not described by an inactive deployment unit when instantiating the virtual network function.

9. The method according to claim 8, wherein the specific information element comprises "scale_in_out", and the value of the specific information element for the inactive virtual deployment unit is zero.

10. The method according to claim 8, wherein the specific information element comprises "number_of_instances", and the value of the specific information element for the inactive virtual deployment unit is zero.

11. The method according to claim 8, further comprising:
    instantiating the virtual network function component described by the inactive virtual deployment unit after instantiating the virtual network function.

12. The method according to claim 11, further comprising:
    instantiating the virtual network function component described by the inactive virtual deployment unit in response to receiving a trigger from an application.

13. The method according to claim 11, further comprising:
    instantiating the virtual network function component described by the inactive virtual deployment unit by performing a scale out operation.

14. The method according to claim 11, further comprising:
    instantiating the virtual network function component described by the inactive virtual deployment unit by performing a dedicated operation.

15. A computer program product embodied on a non-transitory computer-readable medium, said product comprising code for performing a method according to claim 8 when run on a processor or module.

* * * * *